Robert W. Hamilton.
Improvement in Lock-Nuts.

117881      Patented Aug 8 1871

Witnesses
Chas H Smith
Geo. D. Walker

Robert W. Hamilton,
Lemuel W. Serrell
Atty

UNITED STATES PATENT OFFICE.

ROBERT W. HAMILTON, OF NEW YORK, N. Y., ASSIGNOR TO WILLIAM L. WILLIAMS, OF SAME PLACE.

IMPROVEMENT IN LOCK-NUTS.

Specification forming part of Letters Patent No. 117,881, dated August 8, 1871.

*To all whom it may concern:*

Be it known that I, ROBERT W. HAMILTON, of the city and State of New York, have invented and made a certain new and useful Improvement in Lock-Nuts; and the following is declared to be a correct description of the same.

Lock-nuts have heretofore been made in which the main nut that screws upon the bolt has been slitted and a tapering screw-thread formed upon its periphery, upon which screws a clamping-nut to clamp the main nut to the bolt. The nature of my invention consists in providing a slit in the end of an ordinary bolt and a conical recess in the end of said bolt, in which recess a pointed bolt enters to spread the end of the main bolt and clamp its thread against the thread of the nut, which latter receives the ends of both bolts, the clamping-bolt entering the outer end of said nut, and being screwed against the main bolt after the nut has been turned to its place on said main bolt.

Figure 1:
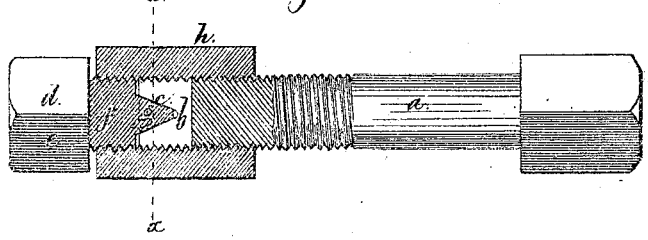
Figure 2:
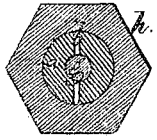
Figure 3:
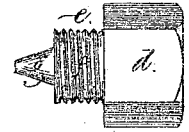

In the drawing, Figure 1 is a longitudinal section, showing the nut and bolt. Fig. 2 is a cross-section at the line $x\,x$, and Fig. 3 is an elevation of the clamping-bolt detached.

$a$ is a screw-bolt of any desired size or character. At the screw end there is a longitudinal slit, $b$, and a conical recess, $c$. $d$ is the clamping-bolt, consisting of a head, $e$, screw $f$, and conical plug $g$. The screw $f$ is the same size and pitch as the screw upon the bolt $a$, so that the internal thread of the cylindrical nut $h$ fits both of them. The nut $h$ being screwed upon the bolt $a$ and tightened up to its place, the clamping-bolt $d$ is entered in its outer end and screwed up until the conical plug $g$ is forced into the recess $c$ to spread the end of the bolt $a$ and clamp it and the nut $h$ together, so that the nut will not become loose in consequence of any jarring to which it may be exposed. This clamping-bolt is easily and quickly applied, and the ordinary screw-bolt can be readily altered so as to use the cylindrical nut and clamping-bolt.

I claim as my invention—

1. The screw-bolt, with a split end and tapering recess, combined with the nut and clamping-bolt, substantially as described.

2. A cylindrical nut, receiving the ends of the main and clamping-bolts, so that the nut is prevented from turning by screwing the clamping-bolt against the end of the main bolt, as set forth.

Signed by me this 3d day of March, 1871.

ROBERT W. HAMILTON.

Witnesses:
CHAS. H. SMITH,
GEO. T. PINCKNEY.